United States Patent [19]

Gossling

[11] 4,126,774

[45] Nov. 21, 1978

[54] ELECTRICALLY ILLUMINATED PUSH-BUTTONS AND INDICATORS

[76] Inventor: Christopher C. Gossling, Cantelupe Rd., East Grinstead, Sussex, England

[21] Appl. No.: 785,663

[22] Filed: Apr. 7, 1977

[30] Foreign Application Priority Data

Apr. 6, 1976 [GB] United Kingdom ............... 13949/76

[51] Int. Cl.$^2$ ............................................... G01H 9/04
[52] U.S. Cl. ..................................................... 200/314
[58] Field of Search ......................... 200/314, 313, 316

[56] References Cited

U.S. PATENT DOCUMENTS

| | | | |
|---|---|---|---|
| 3,315,060 | 4/1967 | Rothweiler | 200/314 |
| 3,355,566 | 11/1967 | Bury | 200/314 |

FOREIGN PATENT DOCUMENTS 234,657 2/1945 Switzerland.

*Primary Examiner*—S. Clement Swisher
*Attorney, Agent, or Firm*—Shlesinger, Arkwright, Garvey & Dinsmore

[57] ABSTRACT

An electrically illuminated push button switch or indicator which can be used to operate and/or indicate a particular circuit, the device is provided with an enclosed light source which can safely be used in semi-hazardous surroundings and permits easy lamp replacement in the event of failure. The device includes a housing having a lamp holder at one end and being closed at the other end by a removable member having a translucent portion, the housing and the member having a pair of slidably concentric sleeves inside which a lamp is disposed.

6 Claims, 1 Drawing Figure

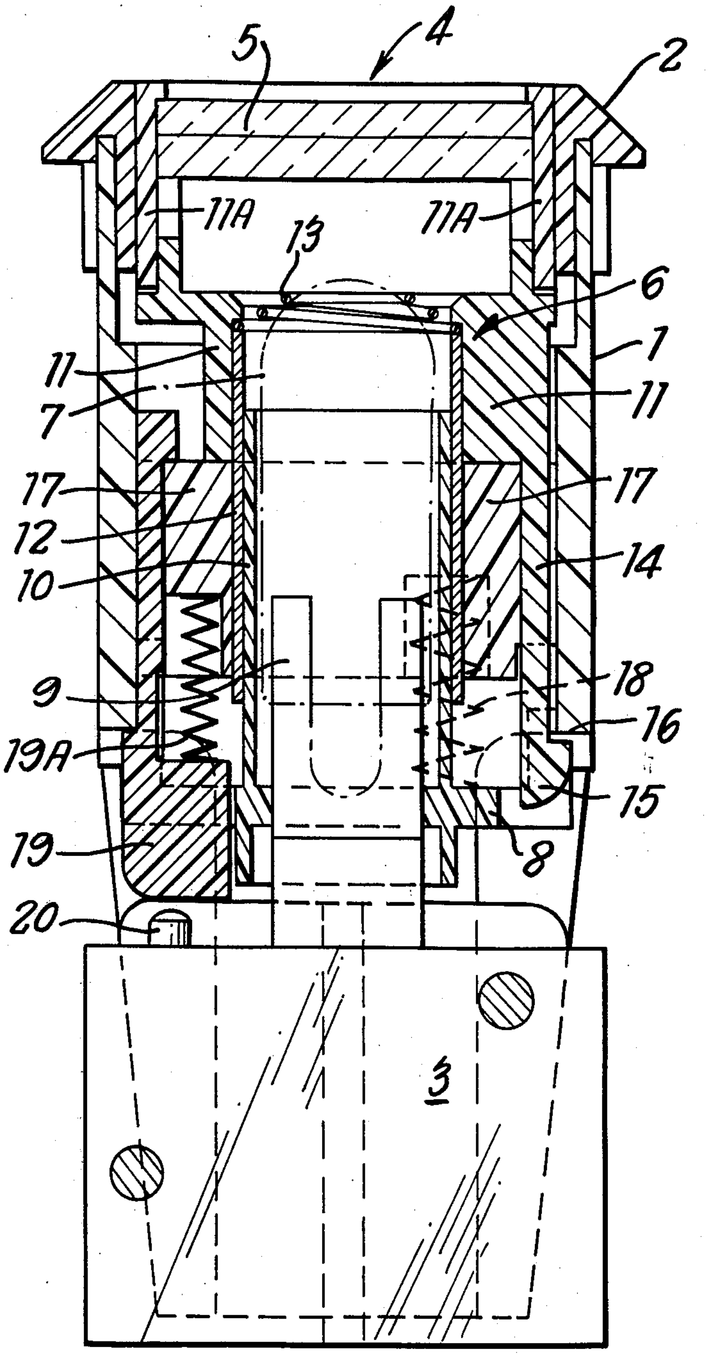
5
4
2
11A
11A
13
6
1
11
11
7
17
17
12
14
10
9
18
16
19A
15
19
8
20
3

ELECTRICALLY ILLUMINATED PUSH-BUTTONS AND INDICATORS

BACKGROUND AND SUMMARY OF THE INVENTION

This invention relates to electrically illuminated push buttons and indicators which are used for example to indicate that a switch or an electrical circuit is in the 'on' position or that some piece of electrical or other apparatus is operating.

If such devices incorporating a filament bulb are used in semi-hazardous surroundings, such as for example on the delivery pumps at petrol filling stations, precautions have to be taken to prevent a fire or an explosion in the event of a spark due to a lamp failure. The present invention provides an illuminated push button or indicator which can safely be used in semi-hazardous surroundings and in which the illuminating bulb can readily be replaced in the event of failure.

According to the present invention there is provided an illuminated push button or indicator comprising a housing having a lamp holder at one end thereof, said lamp holder having a first, tubular sleeve member extending therefrom to enclose a lamp connected to the lamp holder and a member detachably mounted on the other end of said housing provided with a translucent portion illuminable by said lamp, said detachably mounted member being slidable with respect to said lamp holder by means of a second tubular sleeve member which fits over said first sleeve and is axially slidable thereon.

The invention also provides a push-button operated illuminated switch comprising an elongated housing containing a lamp holder at one end thereof, said lamp holder having a first tubular sleeve member extending therefrom and enclosing a lamp connected to said lamp holder, the other end of said housing being closed by a plunger member having a first portion one end of which is provided with a translucent portion and from the other end of which extends a second tubular sleeve member which surrounds and is axially slidable on said first tubular sleeve member, said plunger member being slidable within said housing, said plunger having a longitudinally extending resilient arm extending inside said housing and the free end of which is provided with a catch member releasably engageable with an abutment on said housing, said plunger member including a second portion slidable within said housing and disposed between the first portion of the plunger member and the lamp holder and being urged towards said first portion by spring means, said second portion of the plunger means having a spring biassed member extending out of said housing to operate a switch mounted outside the housing and adjacent to said lamp holder.

DESCRIPTION OF THE DRAWINGS

A preferred embodiment of the present invention will now be described with reference to the accompanying drawings which is a longitudinal cross-sectional view of an illuminated push button operated switch.

DESCRIPTION OF THE PREFERRED EMBODIMENT

As shown, an illuminated push-button operated switch comprises a body 1, at the front end of which is formed a bezel 2 by which the body is mounted for example in an aperture in a panel. At the rear of the body is mounted a switch 3 to be operated by the push button. This switch 3 can be of any known type and may be designed for use in hazardous conditions. However, the switch 3 forms no part of the present invention.

To operate the push-button 4, finger pressure is applied to a translucent front cover 5 which may be clear or coloured, and/or carries lettering or other indicia which, when illuminated, indicates the identity of the circuit being operated. The cover 5 is mounted at the front end of a sliding plunger member 6 which slides inside the body 1.

A lamp 7 is supported in a lamp holder 8 secured to the body 1 and including contacts 9 through which the lamp is connected to the associated circuit. The type of lamp illustrated is of the push-in capless type and the contacts 9 are in the form of pressure blades fitted to the base of the lamp holder 8 and which press against the exposed connection wires of the lamp. A bayonet type of lamp could equally well be used, but the screw-in type is not suitable as this type can readily work loose with a danger of arcing between the lamp cap connections and the contacts. A tubular sleeve 10 extends forwardly from the base of the lamp-holder 8 to surround the lamp 8 and the contacts 9.

The plunger member 6 is in two parts comprising a front portion 11, 11A of a box formation closed by the front cover 5. A tubular sleeve 12 is secured to the rear of the front portion 11 and extends in a close sliding fit around the outside of the sleeve 10. This sleeve 12 is preferably of metal but it may be of the same material as the plunger 6, such as a synthetic plastics. The top of the lamp 7 protruding beyond the sleeve 10, extends inside the sleeve 12 and illuminates the interior of the front portion 11 when the respective circuit is energised.

A spiral spring 13 is positioned at the left hand end of the sleeve 12 and serves to hold the lamp 7 firmly in place in the lamp holder 8.

A resilient arm 14, having a catch member 15 formed at its free end, extends from the front member 11 through the body 1 and the catch member 15 engages behind an abutment 16. Depressing the catch member 15 allows the front member 11 to be slid out of the front of the body 1 to allow access to the lamp 7. It can be seen that in order to do this, access must be gained to the rear of the panel in which the push button has been mounted and for safety reasons it can be arranged that this can only be done after unlocking the panel and thus unauthorised tampering with the lamp, which could be dangerous in semi-hazardous surroundings, is prevented.

The right-hand or inner end of the front portion 11 contacts a sliding rear portion 17 of the plunger member 6 which is biassed to the left by one or more springs 18, only one of which is shown. A spring loaded plunger 19 is arranged to contact the operating button 20 of the switch 3 and is urged towards the switch 3 by a coil compression spring 19A.

Pressure applied to the front cover 5 causes the front and rear portions 11 and 17 of the member 6 to move inwardly against the action of the or each spring 18 until the plunger 19 operates the switch 3. In the event of the lamp 7 shattering for any reason, the only explosive vapour which may be in contact with the lamp 7 to be ignited by it will be contained inside the box-like front portion 11 of the member 6. The only communication between the inside of the portion 11 and the atmosphere is the very narrow gap between the sleeves 10 and 12 and thus the risk of any flame from an explosion inside the front portion 11, itself an extremely unlikely occurrence, from reaching the atmosphere is virtually impossible, particularly if use of the assembly is restricted to semi-hazardous surroundings.

When used as an indicator rather than as a push button, the rear portion 17 and the plunger 19 may be replaced by a fixed stop member, suitable connections to the lamp holder being provided, the switch 3 being omitted.

I claim:

1. An illuminated push-button or indicator particularly adapted for use in areas of hazardous atmosphere comprising a housing having a lamp holder at one end thereof, said lamp holder having a first tubular sleeve member extending therefrom to enclose a lamp connected to said lamp holder, and a plunger member detachably mounted on the other end of said housing, said plunger member being slidable in said housing and comprising a first portion closed at one end thereof by a translucent portion and having at the other end thereof a second tubular sleeve member adapted to telescopically engage said first tubular sleeve member so that said tubular sleeve members are telescopically slidable relative to each other upon actuation of said plunger member said sleeve members forming a gap preventing flame from an interior explosion from reaching the exterior atmosphere.

2. An illuminated push button or indicator according to claim 1 wherein said plunger member is provided with a resiliently flexible arm extending inside said housing, the free end of said arm having a catch member engageable with an abutment provided on said housing.

3. An illuminated push button or indicator according to claim 1 wherein the plunger member comprises a second portion which is slidable within said housing and is baised towards said first portion by spring means.

4. An illuminated indicator according to claim 1 wherein the lamp holder is provided with contact means connected to an electrical circuit and the lamp is arranged to indicate a selected circuit condition.

5. An illuminated push button according to claim 1 wherein the lamp holder is provided with contact means by which it is connected to an electrical circuit, and said plunger member is operable to energise said lamp to indicate a selected circuit condition.

6. A push-button operated illuminated switch adapted for use in areas of hazardous atmosphere comprising an elongated housing containing a lamp holder at one end thereof, said lamp holder having a first tubular sleeve member extending therefrom and enclosing a lamp connected to said lamp holder, the other end of said housing being closed by a plunger member having a first portion one end of which is provided with a translucent portion and from the other end of which extends a second tubular sleeve member which surrounds and is telescopically slidable on said first tubular sleeve member said sleeve members forming a gap preventing flame from an interior explosion from reaching the exterior atmosphere, said plunger member being slidable within said housing, said plunger having a longitudinally extending resilient arm extending inside said housing and the free end of which is provided with a catch member releasably engageable with an abutment on said housing, said plunger member including a second portion slidable within said housing and disposed between the first portion of the plunger member and the lamp holder and being urged towards said first portion by spring means, said second portion of the plunger means having a spring biassed member extending out of said housing to operate a switch mounted outside the housing and adjacent to said lamp holder.

* * * * *